(12) United States Patent
Delves et al.

(10) Patent No.: US 7,718,061 B2
(45) Date of Patent: May 18, 2010

(54) APPARATUS FOR INHIBITING FINES CARRYOVER

(75) Inventors: James Edward Delves, Portishead (GB); David John Parkinson, Walton-in-Gordano (GB); Simon Thomas Henry Brock, Portishead (GB)

(73) Assignee: Cameron International Corporation, Houston, TX (US)

(*) Notice: Subject to any disclaimer, the term of this patent is extended or adjusted under 35 U.S.C. 154(b) by 1155 days.

(21) Appl. No.: 10/536,573

(22) PCT Filed: Nov. 28, 2003

(86) PCT No.: PCT/GB03/05174

§ 371 (c)(1), (2), (4) Date: Jan. 19, 2006

(87) PCT Pub. No.: WO2004/050210

PCT Pub. Date: Jun. 17, 2004

(65) Prior Publication Data

US 2006/0163176 A1    Jul. 27, 2006

(30) Foreign Application Priority Data

Dec. 3, 2002  (GB)  .................... 0228199.6

(51) Int. Cl.
*B01D 24/12* (2006.01)
*B01D 24/46* (2006.01)

(52) U.S. Cl. .................... 210/275; 210/291; 210/512.1; 210/196; 406/92; 406/198

(58) Field of Classification Search ....................... None
See application file for complete search history.

(56) References Cited

U.S. PATENT DOCUMENTS

| | | | |
|---|---|---|---|
| 2,893,949 A * | 7/1959 | Prater | 208/150 |
| 2006/0163176 A1 * | 7/2006 | Delves et al. | 210/792 |

* cited by examiner

*Primary Examiner*—Robert James Popovics
(74) *Attorney, Agent, or Firm*—Mossman Kumar & Tyler PC

(57) ABSTRACT

Apparatus for inhibiting fines carryover in the form of a settlement tank comprising: a filter which divides the tank into upper and lower portions; a fluid inlet in the lower portion for admitting into the tank a fluid with entrained solids; and a fluid outlet in the upper portion through which filtered fluid can leave the tank. The filter comprises filter media supported on a permeable wall, the wall including a filter media outlet which is normally closed, and opening means for opening the filter media outlet to allow the filter media to discharge into the lower portion of the tank. The invention also relates to a method of refilling the filter with filter media.

20 Claims, 1 Drawing Sheet

APPARATUS FOR INHIBITING FINES CARRYOVER

This invention relates to apparatus for the inhibiting fine solids carryover. Particularly, although not exclusively, this invention relates to apparatus for receiving a slurry from a pipeline or duct into a pressure vessel which is fitted with a fluidising unit for further transport at an elevated pressure, set concentrations, velocities, and flowrates to suit a given process or transport need, and in particular for the management of fine solids entrained in a liquid/solid slurry, which are slow settling or neutrally buoyant, such as radioactive wastes from settling ponds in nuclear PowerStations, or rare earth elements or other elements in the mining and minerals extraction industries.

BACKGROUND TO THE INVENTION

In the decommissioning of nuclear PowerStation's there is a need to treat wet wastes. These wastes are made up of solids such as sands from old filter beds, ion exchange resins, activated carbons and wastes from laundries and wash waters. The particles are allowed to settle over time in ponds, which are specially constructed tanks, such as final delay and monitoring tanks. This creates a sludge layer at the bottom of the tank, which has to be safely removed and transported to a cementation process to encapsulate this radioactive waste for safe disposal.

GB 0212728.0 describes a fluidising unit which creates a swirling flow and fluidises solids, such as waste sludge, and can be used to transport these solids at the required relative density to a cementation or sinter process, or other means of disposal, such as boxes/drums for burial in specially constructed deep mines, or bore holes in the earth's strata. The disclosures of that document are incorporated herein by reference.

U.S. Pat. Nos. 4,978,251, 4,952,099, 4,992,006 and 5,853,266 disclose fluidising units which could also be used for the transportation process.

In practice the type of sludge that is encountered tends to have a very high proportion of small particles, typically in the range 0.1 microns to 30 microns. These particles can also have a structure based on interwoven platelets of clay for example, which have a high porosity, which together with their size renders them almost neutrally buoyant in water, or at the very least very slow settling.

The rate at which these solids will settle can be calculated using Stokes Law assuming variables such as density of solids, water temperature, and viscosity of water, shape of solids particle, expected particle interactions and concentrations, which are all known and based on the normal force of gravity. This is better known as the particles hindered settling velocity and can typically be measured in part of a millimeter per second. Given therefore that the particle size distribution is known, based on size, volumes and counts per milliliter, a reasonable estimate can be made on the amount of time that will be required for the particles to settle out over a certain distance in a certain time, normally referred to in separation as required retention time.

Based on this the size of a tank or pressure vessel receiving the slurry of fine solids can be physically sized to ensure that no solids are carried over out of the top of the receiving vessel due to displacement of water due to settling solids or pump suctions. Such a vessel could be prohibitively large and uneconomically viable, as well as requiring too much time to effect separation or inhibit carry over of solids.

Patent Specification CA2007250 shows a system for accepting slurry for hydrotransportation by using a fluidising unit, which uses an inclined torroidal shaped vessel constructed from pipes with 180° returns on each of its ends, where the overflow water, displaced by incoming solids passes through a laminar type plate separator in an attempt to inhibit fine solids from carrying over. In practice the fine solids are too small to be effectively removed from the overflow water by this means.

With regard to the application discussed for decommissioning of nuclear PowerStation's this would be unacceptable, as the overflow waters would be returned back to the tank being cleaned, hence recycling all the fine solids back where they originated from; the need to eventually clean the water in the tank would be compounded by this return of solids, as the water would normally be pumped to a membrane filter, RO unit or molecular sieve, all of which would suffer operational problems when high levels of solids are delivered to them as their primary function is to act as tertiary or polishing filters. Any decanted solids from these units would have to report back to the transport vessel in some safe way to be delivered to, for example, the cementation process.

STATEMENT OF INVENTION

According to the present invention there is provided means to receive a slurry of mixed fast and slow settling solids, with means to reduce the volume of the receiving vessel and ensure that no targeted fine solids are carried over back to the tank they came from, but rather are trapped within the vessel to ensure that during transport mode they are delivered to the next process system downstream.

The apparatus comprises of:

A pressure vessel with preferably a tangential slurry inlet means which causes the slurry to swirl around the wall of the vessel, encouraging larger or heavy solids to rapidly migrate to the outside of the vessel and in doing so encouraging some of the smaller solids to go with them and downwards to its base.

A crude baffle to stop flow short-circuiting to the media sandwich whilst defining a annular flow path either clockwise or anticlockwise within the vessel and thus imparting a swirl to the slurry flow and where possible the lowest pressure drop or back pressure to the slurry delivery line.

A media sandwich, made up of fine perforated sheet metal or wedge wire type screens, designed such that the media contained within the media sandwich plates cannot escape. Such media can be ceramic spheres, ion exchange resin, new or used sand, garnet or other loose random packed filtration media as may be required for a specific duty. The media sandwich is equipped with means to open a dump port at its bottom from outside the vessel to allow the filter media to fall freely to the base of the vessel, and means at its top for receiving a fresh media fill. The base of the media sandwich would normally in practice be constructed to be conical at its base in order to both increase surface area, which in turn reduces the filtration flux rate (unit flow per unit area per unit time) and hence the pressure drop through the media sandwich and ensure that the correct angle of repose is available for media within the sandwich to evacuate once the dump port is opened.

A fluidising unit of the type mentioned previously for the discharge of solids from the vessel, the unit can be of the type requiring a separate inlet for water and outlet for slurry, or any other fluidising unit, suction of a slurry pump or jet pump or inductor as may be acceptable from time to time, with a valve means to shut off flow by valve means at both inlet and outlet nozzles.

A balance flow ring or distribution system that allows some of the water reporting to the inlet to the fluidising unit to report to the top of the vessel and flow downwards through the media sandwich.

A slurry discharge nozzle with a valve means to shut off flow out of the vessel.

A top mounted nozzle which allows overflow water, or water reporting due to suction to a pump's inlet, out of the vessel; such water would have had to have passed through the media sandwich at a predetermined flowrate per unit area, such that any fine solids in said water are caused to be filtered out and form a cake on the bottom surface edge of the filter sandwich. This will be happening during the slurry inlet phase. Once a Delta P (pressure drop) is measured between the slurry inlet pipe and the overflow/pump suction nozzle to a predetermined level, this signifies that the media sandwich has sufficient cake layer to inhibit flow at the delivery pressure in question. Once the design conditions are achieved, the slurry inlet valve is closed, the overflow/pump suction outlet is closed, the feed to the fluidising unit is opened, as is the balance flow, and the slurry discharge valve is opened. Slurry is then transported out of the vessel at the given concentrations and pressures required for downstream conditions. Flow passing to the balance flow distributor at the top of the vessel passes down through the media sandwich and back flushes and cleans the cake of fine solids from the bottom edge of the media sandwich. The cake reports to the fluidisation unit for transport to the next process. In cases where the media sandwich is difficult to clean then one of the following methods for example, can be employed to ensure it is cleaned in situation:
(1) Chemical/surfactant injection
(2) Ultrasonic transducers
(3) High volume air jetting
(4) Forcing a change in the naturally occurring electrical charge between media, water, and solid particles, i.e. modifies the Zeta potential, to cause a repulsive force.

Once the transport vessel is empty, which can be signified by a density probe or ultrasonic level detectors or similar, the vessel returns to its fill mode, If required, by inclusion of an extra vessel the system can be used to discharge continuously set slurry concentrations and flowrates.

At the end of a tank cleaning job the media in the media sandwich is dumped into the base of the vessel for transport to the cementation process, or wherever it is required. The vessel can now be chemically cleaned and decontaminated and moved to the next project.

The system described above can equally be used in the capturing of rare elements and earths, which are very fine. The discharge slurry from the transport vessel could then be fed to solid/liquid cyclones to further concentrate the target slurry. This reduced volume could then pass on to a centrifuge or vacuum drying system as may be practicable.

BRIEF DESCRIPTION OF DRAWINGS

FIG. (1) is a flow schematic of one type of system according to the present invention:

A pressure vessel 1 with preferably a tangential slurry inlet means 2 which causes the slurry to swirl around the wall of the vessel 1, encouraging larger or heavy solids to rapidly migrate to the outside of the vessel 1 and in doing so encouraging some of the smaller solids to go with them and downwards to its base.

Figure 1:
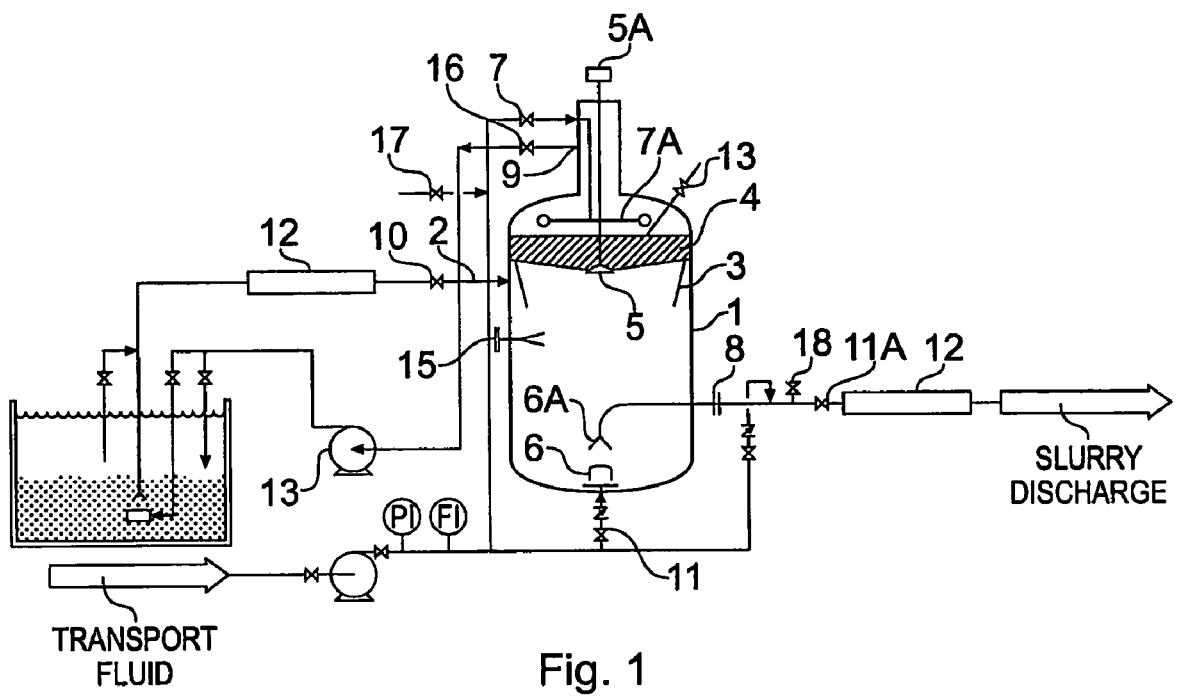
Figure 2:
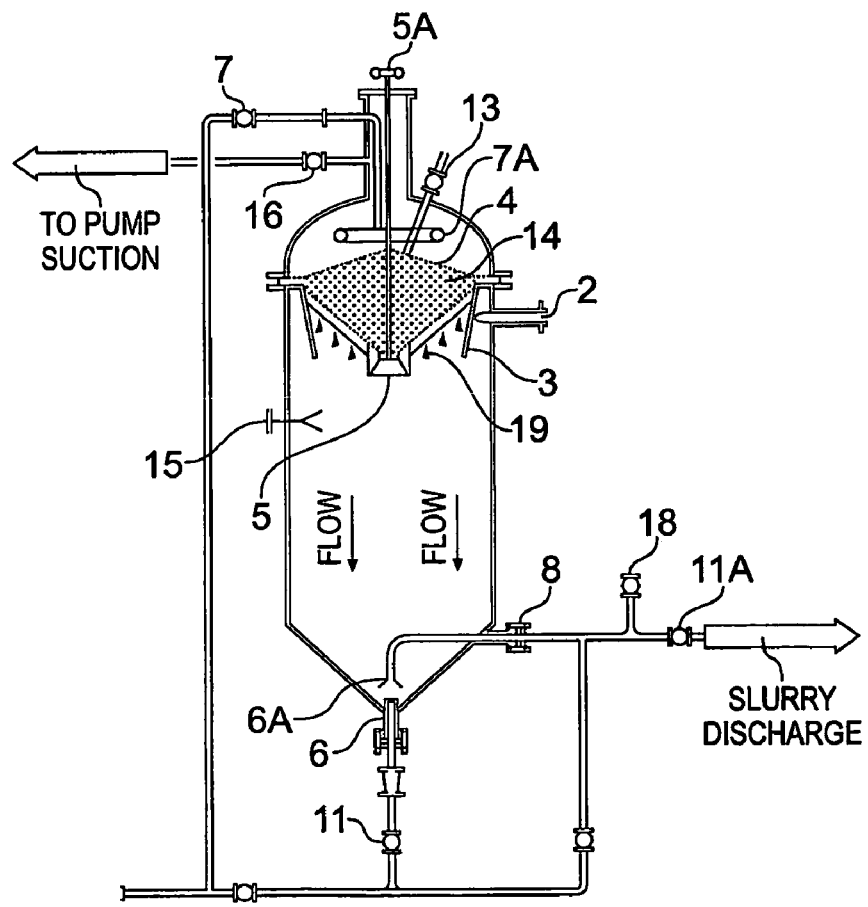

A cyclonic baffle 3 to stop flow short-circuiting to the media sandwich 4 whilst defining a annular flow path either clockwise or anticlockwise within the vessel and thus imparting a swirl to the slurry flow and where possible the lowest pressure drop or back pressure to the slurry delivery line 2.

A media sandwich 4, made up of fine perforated sheet metal or wedge wire type screens, designed such that the media 14 contained within the sandwich plates cannot escape, such media 14 can be ceramic spheres, ion exchange resin, new or used sand, garnet or other loose random packed filtration media as may be required for a specific duty. The media sandwich 4 is equipped with means to load with media from the top 13 without the need to gain entry into the vessel 1, and to open a dump port 5 at its bottom from outside of vessel 1 by operating media dump valve 5A to allow the filter media 14 to fall freely to the base of the vessel 1.

A fluidising unit 6 and 6A of the type mentioned previously for the discharge of solids from the vessel 1, with a valve means 11 to shut off the inlet water flow to fluidising unit 6 and a valve means 11A to shut off the slurry outlet flow from fluidising unit 6A.

A balance flow ring or distribution system 7A that allows some of the water reporting to the inlet to the fluidising unit 6 to report to the top of the vessel 1 and flow downwards from the distribution system 7A through the media sandwich 4.

A slurry discharge nozzle 8 from vessel 1 with a valve means 11A to close slurry flow off out of the vessel 1.

A top mounted nozzle 9 which allows overflow water, or water reporting due to suction of a pump 13, out of the vessel 1, such water would have had to have passed through the media sandwich 4 at a predetermined flowrate per unit area, such that any fine solids in said water are caused to be filtered out and form a cake on the bottom surface edge of the media sandwich 4 during the slurry inlet phase via nozzle 2. A Delta P (pressure drop) measured between the slurry inlet pipe 2 and the overflow/pump suction nozzle 9 to a predetermined level, signifies that the media sandwich has sufficient cake layer to inhibit flow at the delivery pressure in question. Alternatively a level indicator transmitter 15 indicates that vessel 1 has reached its design solids level ready for transport to start; this could equally be achieved by a load cell. Once the design conditions are achieved, the slurry inlet valve 10 is closed, the overflow or pump suction outlet valve 16 is closed, the valve 11 to the fluidising unit is opened, as is the balance flow valve 7, and the slurry discharge valve 11A.

Slurry is then transported out of the vessel 1. Flow passing to the balance flow distributor 7A at the top of the vessel passes down through the media sandwich 4 and back flushes and cleans the cake of fine solids from the bottom edge of the media sandwich 4. The cake reports to the fluidisation unit 6 & 6A for transport to the next process together with the larger and heavier solids. In cases where the media sandwich 4 is difficult to clean then chemical means can be introduced via balance flow 7 & 7A via valve means 17 to backwash the media sandwich 4. If required the media 14 can also be dropped to the base of vessel 1 by operating the media dump valve 5A to allow the media 14 to be transported to the next process with the contaminated solids. The media sandwich 4 is then recharged with fresh or more suitable media 14 as may be the case via valve means 13. Also if further back flushing of the media sandwich 4 with or without its media 14 is required, then by closing valve 11A and opening valve 18 with all other valve means other than 7 closed a continuous flush can be operated as may be required to recover the media sandwich 4 clean condition.

Once the transport vessel 1 is empty, which can be signified by a density probe or ultrasonic level detectors ore other means, the vessel returns to its fill mode, and the sequence is repeated.

The addition of a tubular ultrasonic unit 12 in the slurry feed line can be used either to de-agglomerate solids, or collapse platelets to assist or increase their hindered settling rate. The tubular ultrasonic unit 12 could equally be placed in the slurry discharge line from vessel 1, the benefits being that on the discharge side of the transport vessel 1 the pressure required to reach the next process can be reduced by particle size reduction in lowering of viscosities at temperature and mixing and combining of particles.

At the end of a tank cleaning job the media in the media sandwich 4 is dumped into the base of the vessel 1 for transport to the cementation process, or wherever it is required. The vessel 1 can now be chemically cleaned and decontaminated and moved to the next project.

FIG. (2) is a section through the transport vessel 1 indicating cake removal 19.

The invention claimed is:

1. A tank having:
    a filter which divides the tank into upper and lower portions;
    a fluid inlet in the lower portion for admitting into the tank a fluid with entrained solids; and
    a fluid outlet in the upper portion through which filtered fluid can leave the tank,
characterized in that the filter comprises:
    filter media supported on a permeable wall, the wall including a filter media outlet which is normally closed; and
    opening means for opening the filter media outlet to allow the filter media to discharge into the lower portion of the tank.

2. A tank as claimed in claim 1, in which the wall of the filter is substantially conical, tapering downwardly to the filter media outlet.

3. A tank as claimed in claim 1, in which the opening means for opening the filter media outlet comprises a valve in the said filter media outlet.

4. A tank as claimed in claim 1, in which means is provided for operating the opening means remotely.

5. A tank as claimed in claim 1, in which a baffle is provided adjacent the fluid inlet to direct the flow of fluid and entrained solids away from the filter.

6. A tank as claimed in claim 5, in which the baffle is annular and induces a cyclonic flow in the fluid and entrained solids entering the tank.

7. A tank as claimed in claim 1, in which the permeability of the wall is provided by perforations in the wall.

8. A tank as claimed in claim 7, in which the wall comprises a mesh sheet.

9. A tank as claimed in claim 1, in which the wall is formed from a plurality of individual screens.

10. A tank as claimed in claim 1, in which a filter media inlet is provided in the tank above the filter.

11. A tank as claimed in claim 1, in which a second filter media outlet is provided in the tank below the filter.

12. A tank as claimed in claim 1, in which a fluidising unit is provided in the lower portion of the tank.

13. A tank as claimed in claim 12, in which the fluidising unit discharges fluidised solids from the tank through a solids discharge duct.

14. A tank as claimed in claim 12, in which the filter media discharged from the filter into the lower portion of the tank is removed from the tank by the fluidising unit.

15. A tank as claimed in claim 12, in which the fluidising unit is fed with fluid from a second tank.

16. A tank as claimed in claim 1, in which back flushing means are provided for back flushing the filter media.

17. A tank as claimed in claim 16, in which the back flushing means comprises a flow distribution device which distributes a flushing fluid over an upper surface of the filter media.

18. A tank as claimed in claim 16, in which the back flushing means is fed with fluid from the second tank.

19. A tank as claimed in claim 18, in which the flushing fluid is water.

20. A tank having:
    a filter which divides the tank into upper and lower portions;
    a fluid inlet in the lower portion for admitting into the tank a fluid with entrained solids; and
    a fluid outlet in the upper portion through which filtered fluid can leave the tank,
characterized in that the filter comprises:
    filter media supported on a permeable wall, the wall including a filter media outlet which is normally closed, where the wall is substantially conical, tapering downwardly to the filter media outlet, and where the wall comprises a feature selected from the group consisting of perforations in the wall, a mesh sheet, a plurality of individual screens and combinations thereof; and
    opening means for opening the filter media outlet to allow the filter media to discharge into the lower portion of the tank.

* * * * *